(12) United States Patent
Kuroda et al.

(10) Patent No.: US 12,148,412 B2
(45) Date of Patent: Nov. 19, 2024

(54) INFORMATION PROCESSING APPARATUS AND INFORMATION PROCESSING METHOD

(71) Applicant: SONY GROUP CORPORATION, Tokyo (JP)

(72) Inventors: Yoshiyuki Kuroda, Tokyo (JP); Kohei Asada, Tokyo (JP); Koya Sato, Tokyo (JP); Masaki Kamata, Tokyo (JP); Tetsunori Itabashi, Tokyo (JP); Shigetoshi Hayashi, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 18/001,466

(22) PCT Filed: May 25, 2021

(86) PCT No.: PCT/JP2021/019750
§ 371 (c)(1),
(2) Date: Dec. 9, 2022

(87) PCT Pub. No.: WO2021/256186
PCT Pub. Date: Dec. 23, 2021

(65) Prior Publication Data
US 2023/0230568 A1    Jul. 20, 2023

(30) Foreign Application Priority Data

Jun. 19, 2020 (JP) .................. 2020-106128

(51) Int. Cl.
*G10K 11/178* (2006.01)
*B60R 16/02* (2006.01)

(52) U.S. Cl.
CPC ........ *G10K 11/17825* (2018.01); *B60R 16/02* (2013.01); *G10K 11/1783* (2018.01);
(Continued)

(58) Field of Classification Search
CPC .......... G10K 11/178; G10K 11/17825; G10K 11/1783; G10K 11/17853;
(Continued)

(56) References Cited

U.S. PATENT DOCUMENTS

2017/0323630 A1* 11/2017 Stickney .......... G10K 11/17854

FOREIGN PATENT DOCUMENTS

| JP | 2006-088804 A | 4/2006 |
| JP | 2018-036327 A | 3/2018 |

OTHER PUBLICATIONS

International Search Report and Written Opinion of PCT Application No. PCT/JP2021/019750, issued on Aug. 10, 2021, 09 pages of ISRWO.

* cited by examiner

*Primary Examiner* — Kile O Blair
(74) *Attorney, Agent, or Firm* — CHIP LAW GROUP

(57) ABSTRACT

Provided is an information processing apparatus including a sensor, an actuator, a vibration control circuit, a transmission circuit, and a reception circuit. The sensor detects vibration of a control target. The actuator provides vibration control of the control target. The vibration control circuit generates a drive signal for the vibration control for the actuator according to an output signal of the sensor, and outputs the generated drive signal to the actuator. The transmission circuit modulates transmission data to produce a transmission signal, and synthesizes the modulated transmission signal to produce the drive signal for the vibration control that is to be outputted to the actuator. The reception circuit extracts a reception signal from the output signal of the sensor, and demodulates the extracted reception signal to produce reception data.

19 Claims, 14 Drawing Sheets

(52) U.S. Cl.
CPC ............... *G10K 11/17875* (2018.01); *G10K 2210/1282* (2013.01); *G10K 2210/3026* (2013.01); *G10K 2210/3028* (2013.01); *G10K 2210/3044* (2013.01)

(58) Field of Classification Search
CPC ....... G10K 11/17875; G10K 11/17883; G10K 2210/1282; G10K 2210/3026; G10K 2210/3028; G10K 2210/3044
See application file for complete search history.

FIG.5

| DATA NAME | DESCRIPTION |
|---|---|
| INDIVIDUAL IDENTIFICATION NUMBER (ID) | DETERMINED DURING MANUFACTURE, UNCHANGEABLE, AND UNDUPLICABLE |
| RECEPTION ID LIST | RECORDED IDS OF MODULES HAVING SUCCEEDED IN TRANSMISSION AND RECEPTION. INITIALLY BLANK. |
| POWER On/Off | 0：OFF、1：ON |
| ACTUATOR EXCESSIVE AMPLITUDE | 0: NORMAL, 1: ABNORMAL |
| ACTUATOR ABNORMAL HEAT GENERATION | |
| SENSOR ABNORMALITY | |
| LOW BATTERY LEVEL | |

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2021/019750 filed on May 25, 2021, which claims priority benefit of Japanese Patent Application No. JP 2020-106128 filed in the Japan Patent Office on Jun. 19, 2020. Each of the above-referenced applications is hereby incorporated herein by reference in its entirety.

TECHNICAL FIELD

The present disclosure relates to an information processing apparatus, an information processing method, and a program.

BACKGROUND ART

In recent years, spatial noise control (NC) has attracted attention as a technology for creating a quiet space. Spatial noise control is roughly classified into two types, that is, active control and passive control. Active control is implemented by using a drive section such as a speaker. Passive control is implemented by using not a drive section but, for example, a sound absorbing material, a sound insulating material, a damping material, or a vibration isolating material or by optimizing a shape. Active control is known to be means that is effective in a low frequency band where passive control has little effect (more specifically, implementation of passive control is difficult due, for instance, to low efficiency, size increase, and high cost).

For conventional headphone NC, active control is exercised to achieve silencing by using, for example, a microphone, as a sensor, for collecting sound and a speaker for controlling noise at an eardrum position targeted for control.

Meanwhile, in some cases, noise is caused by acoustic emission resulting from vibration of an object. In such cases, a control space can be expanded by selecting the object itself, which is the source of acoustic emission, as a control target and actively controlling the vibration itself of the control target. A vehicle interior noise reduction apparatus for reducing vehicle interior noise is proposed in PTL 1 below.

CITATION LIST

Patent Literature

[PTL 1]
 Japanese Patent Laid-open No. 2006-88804

SUMMARY

Technical Problem

Here, in a case where multiple apparatuses each including a vibration control actuator are used, the apparatuses should preferably be capable of communicating with each other from the viewpoint of, for example, improving the performance of vibration suppression and implementing a function of achieving protection against apparatus abnormalities.

Communication between the apparatuses may be established by using, for example, a wired connection or a wireless connection. However, the former case requires the use of a telecommunications cable, and is not user-friendly when, for example, focus is placed on appearance. Meanwhile, the latter case requires the use of wireless communication hardware, and may be affected by a problem caused by the addition of hardware, such as an increase in the cost of apparatus hardware.

An objective of the present disclosure is to provide an information processing apparatus, an information processing method, and a program that are able to satisfactorily build a communication environment.

Solution to Problem

The present disclosure provides an information processing apparatus including, for example, a sensor that detects vibration of a control target, an actuator that provides vibration control of the control target, a vibration control circuit that generates a drive signal for the vibration control for the actuator according to an output signal of the sensor and outputs the generated drive signal to the actuator, a transmission circuit that modulates transmission data to produce a transmission signal and synthesizes the modulated transmission signal to produce the drive signal for the vibration control that is to be outputted to the actuator, and a reception circuit that extracts a reception signal from the output signal of the sensor and demodulates the extracted reception signal to produce reception data.

The present disclosure provides an information processing apparatus including, for example, a sensor that detects vibration of a control target, an actuator that provides vibration control of the control target, a vibration control circuit that generates a drive signal for the vibration control for the actuator according to an output signal of the sensor and outputs the generated drive signal to the actuator, and a transmission circuit that modulates transmission data to produce a transmission signal and synthesizes the modulated transmission signal to produce the drive signal for the vibration control that is to be outputted to the actuator.

The present disclosure provides an information processing apparatus including, for example, a sensor that detects vibration of a control target, an actuator that provides vibration control of the control target, a vibration control circuit that generates a drive signal for the vibration control for the actuator according to an output signal of the sensor and outputs the generated drive signal to the actuator, and a reception circuit that extracts a reception signal from the output signal of the sensor and demodulates the extracted reception signal to produce reception data.

The present disclosure provides an information processing method including, for example, a vibration control process of generating a drive signal for vibration control for an actuator according to an output signal of a sensor and outputting the generated drive signal to the actuator, the sensor detecting vibration of the control target, the actuator providing the vibration control of the control target, a transmission process of modulating transmission data to produce a transmission signal and synthesizing the modulated transmission signal to produce the drive signal for the vibration control that is to be outputted to the actuator, and a reception process of extracting a reception signal from the output signal of the sensor and demodulating the extracted reception signal to produce reception data.

The present disclosure provides a program for causing a computer to execute an information processing method including, for example, a vibration control process of generating a drive signal for vibration control for an actuator according to an output signal of a sensor and outputting the generated drive signal to the actuator, the sensor detecting vibration of the control target, the actuator providing the vibration control of the control target, a transmission process of modulating transmission data to produce a transmission signal and synthesizing the modulated transmission signal to produce the drive signal for the vibration control that is to be outputted to the actuator, and a reception process of extracting a reception signal from the output signal of the sensor and demodulating the extracted reception signal to produce reception data.

BRIEF DESCRIPTION OF DRAWINGS

FIG. 5 is a diagram illustrating a structure example of module information.

DESCRIPTION OF EMBODIMENTS

Embodiments and the like of the present disclosure will now be described with reference to the accompanying drawings. It should be noted that the description will be given in the following order.
<1. First Embodiment>
<2. Second Embodiment>
<3. Modifications>
The embodiments and the like, which are described below, are preferred specific examples of the present disclosure. The contents of the present disclosure are not limited to the embodiments and the like, which are described below. It should be noted that component elements having substantially identical functional configurations are denoted by the same reference signs, and will not be redundantly described as appropriate.

1. First Embodiment

[Issues to Consider]

First of all, issues requiring consideration in relation to the embodiments are described in order to facilitate understanding of the embodiments.

Figure 1:
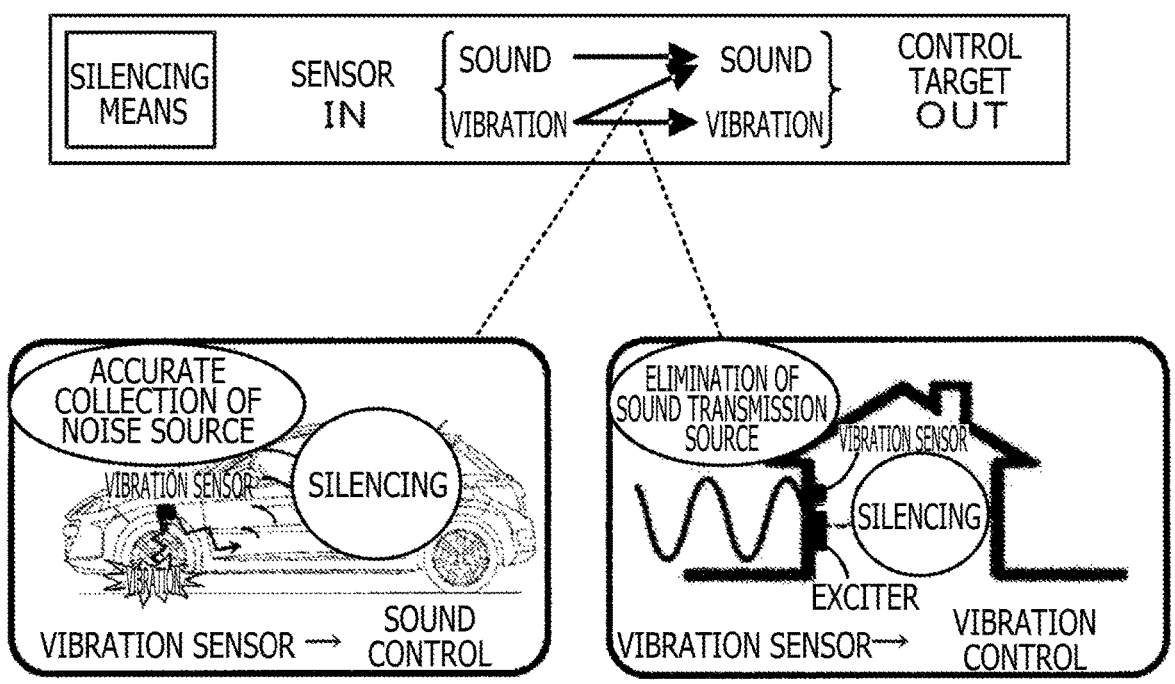
FIG. 1 is a diagram illustrating the classification of sensors and control targets for noise control based on active control.

FIG. 1 illustrates the classification of sensors and control targets for noise control based on active control. Silencing methods are roughly classified, for example, into two types. A first silencing method inputs (detects) sound with a sound sensor such as a microphone, and outputs sound (provides sound control) from a control target such as a speaker. A second silencing method inputs vibration with a vibration sensor such as an acceleration sensor, and outputs sound from the control target such as a speaker. A third silencing method inputs vibration with the vibration sensor such as an acceleration sensor, and controls the vibration of the control target, such as a panel, by using an actuator for excitation purposes.

In a case where noise is caused by acoustic emission resulting from the vibration of an object, a control space can be expanded by actively controlling a target vibration itself as mentioned earlier ("vibration sensor→vibration control" in FIG. 1). However, a control target, that is, a target for control, has complex vibration modes that are determined by various conditions such as a material and a shape.

Figure 2:
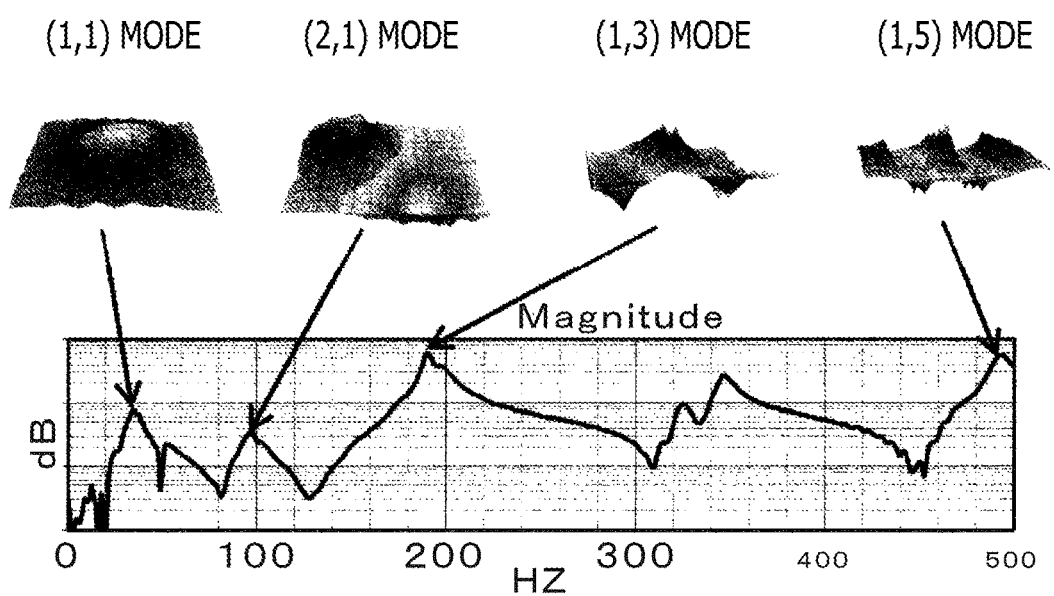
FIG. 2 is a diagram illustrating the shapes and examples of measurement results of panel vibration modes.

FIG. 2 illustrates the shapes and examples of measurement results of panel vibration modes. In FIG. 2, the vertical axis represents an amplitude value (dB), and the horizontal axis represents a frequency (Hz). As is obvious from FIG. 2, an object has great amplitude values at frequencies generated by the vibration modes (e.g., a central part exhibits a high amplitude in a (1,1) mode), and the amount of noise emission can be reduced by efficiently controlling the vibration modes.

However, for example, in a closed space, such as a vehicle interior formed by multiple panels, the panels, which are component elements, form complex vibration modes. In order to control such complex vibration modes, the actuator, which is a control device, also needs to excite the complex vibration modes in a similar manner.

To achieve the above purpose, multiple actuators should be dispersedly disposed in the space to provide improved performance. That is, in vibration control in which an actuator is used, various vibration modes possessed by the object can be effectively suppressed by disposing the multiple actuators. Further, in a case where multiple apparatuses having the actuators as mentioned above are used, it is preferable that the apparatuses be allowed to exchange and share information with each other. This makes it possible, for example, to further improve the performance of vibration suppression and implement a function of achieving protection against apparatus abnormalities. In view of this, a communication scheme for building, by establishing communication through the use of vibration caused by actuators, a communication environment in a more satisfactory manner than the earlier-mentioned communication based on a wired or wireless connection will be proposed in conjunction with the embodiments and the like, which are described below.

[Configuration Example of Noise Control System]

Figure 3:
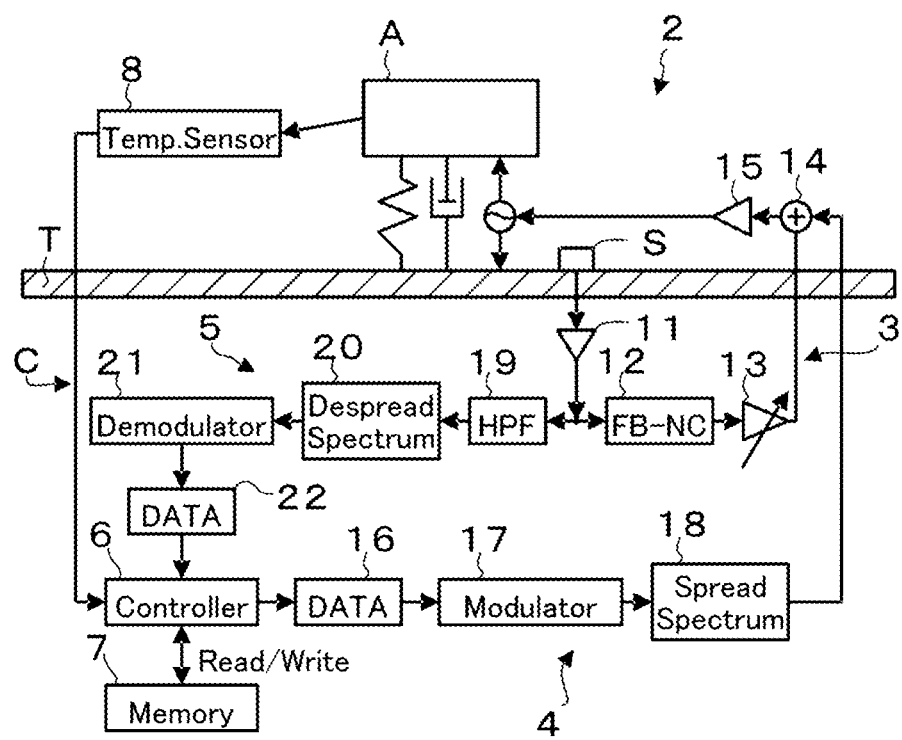
FIG. 3 is a diagram illustrating a configuration example of a noise control system according to a first embodiment.

FIG. 3 illustrates a configuration example of a noise control system (noise control system 1) according to a first embodiment. The noise control system 1 according to the present embodiment includes an information processing apparatus 2. Even when used as a single module (a module including a sensor S and an actuator A), the information processing apparatus 2 operates as a noise reduction apparatus that provides spatial NC and creates a quiet space. Further, the information processing apparatus 2 includes a communication scheme that uses vibration caused by the actuator A. It should be noted that FIG. 1 depicts one information processing apparatus 2. However, the noise control system 1 may include one or more information processing apparatuses 2. The degree of improvement in noise suppression performance increases with an increase in the number of information processing apparatuses 2 included in the noise control system 1.

It is assumed that the noise control system 1 is used with the information processing apparatus 2 mounted on a control target T whose vibration is to be controlled. In such an instance, for example, the information processing apparatus 2 can be provided with a portable housing and configured to be detachable from the control target T. Although not depicted here, the information processing apparatus 2 can be provided with a small-size, lightweight, box-shaped housing that has a detachable structure containing, for example, a suction cup, a magnet, or an adhesive material. This increases the degree of freedom in installing the information processing apparatus 2.

The control target T is an object that may generate noise caused by acoustic emission resulting from vibration, that is, may cause vibration that generates noise caused by acoustic emission. The control target T includes, for example, a glass plate, a metal plate, or other plate-like solids (panel). For example, the control target T may be a frame or a window of an automobile, an airplane, or other movable bodies (more specifically, a vehicle) or a frame or a window of a building. The above-described configuration makes it possible to create a silent space in a movable body or in a building.

[Configuration Example of Information Processing Apparatus]

For example, the information processing apparatus 2 is mounted on a surface (hereinafter, referred to as a target surface) of the control target T, the surface being on the side of a space whose noise is desired to be reduced. This makes it possible to efficiently reduce the noise. The information processing apparatus 2 includes a sensor S, an actuator A, and a signal processing circuit C.

The sensor S detects the vibration of the control target T, and outputs the result of the detection as an output signal. The sensor S includes, for example, an acceleration sensor or the like, the acceleration sensor outputting an acceleration signal corresponding to the vibration. The sensor S is mounted, for example, on the control target T (more specifically, the target surface of the control target T). When mounted on the target surface, the sensor S is able to achieve efficient vibration detection. The sensor S is connected to the signal processing circuit C.

The actuator A is driven according to a drive signal and controls the vibration of the control target T. The actuator A includes, for example, an inertial actuator or the like. It should be noted that the actuator A may include a different type of actuator, such as a piezoelectric actuator. For example, the actuator A is mounted on the control target T (more specifically, the target surface of the control target T) in such a manner that control can be exercised to place the control target T in a predetermined vibration state. When mounted on the target surface, the actuator A is able to efficiently reduce the noise. The actuator A is connected to the signal processing circuit C.

The signal processing circuit C includes, for example, a vibration control circuit 3, a transmission circuit 4, a reception circuit 5, a controller 6, a memory 7, and a temperature sensor 8. The vibration control circuit 3 generates a drive signal for vibration control for the actuator A according to the output signal of the sensor S, and outputs the generated drive signal to the actuator A. The vibration control circuit 3 includes, for example, a sensor output amplifier 11, an FB-NC circuit 12, an output adjustment amplifier 13, a synthesis circuit 14, and an actuator drive amplifier 15.

Figure 4:
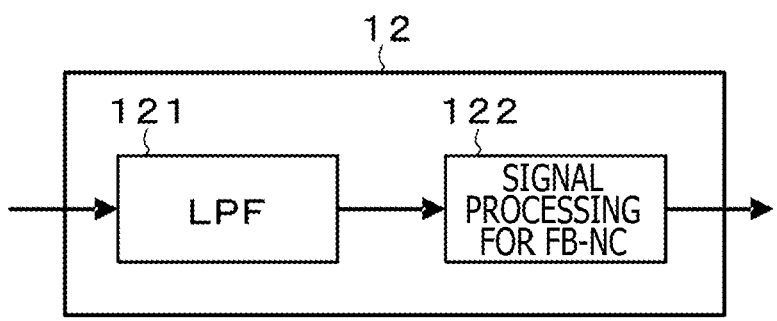
FIG. 4 is a block diagram illustrating an example of an internal configuration of an FB-NC circuit.

The sensor output amplifier 11, which is connected to the sensor S, amplifies the output signal of the sensor S, and outputs the resulting amplified signal. The sensor output amplifier 11 is connected to the FB-NC circuit 12 and to the reception circuit 5. For example, as depicted in FIG. 4, the FB-NC circuit 12 includes a vibration band extraction circuit 121 and an FB-NC signal processing circuit 122. The vibration band extraction circuit 121 includes, for example, a first-order low pass filter (LPF) and the like, extracts a vibration band component (e.g., a low frequency band component lower than 1 kHz) of the control target T from an input signal, and outputs the extracted vibration band component. The vibration band extraction circuit 121 is connected to the FB-NC signal processing circuit 122.

The FB-NC signal processing circuit 122, which is a signal processing circuit for feedback noise control (FB-NC), includes, for example, an FB-NC digital filter and the like. The FB-NC signal processing circuit 122 generates a drive signal for the actuator A, which is used for vibration control of the control target T, according to an input signal, and outputs the generated drive signal. More specifically, the FB-NC signal processing circuit 122 generates a cancelation signal by performing vibration cancelation signal processing on the input signal. The cancelation signal is, for example, opposite in phase to the input signal. The FB-NC signal processing circuit 122 is connected to the output adjustment amplifier 13.

The output adjustment amplifier 13 adjusts the amplitude value (gain) of an input signal as needed, and outputs the adjusted amplitude value. The output adjustment amplifier 13 is connected to the synthesis circuit 14. The synthesis circuit 14 includes, for example, an adder, synthesizes an input signal (e.g., adds the input signal), and outputs the resulting synthesized signal. The synthesis circuit 14 is connected to the actuator drive amplifier 15. The actuator drive amplifier 15 amplifies an input signal, and outputs the resulting amplified signal. The actuator drive amplifier 15 is connected to the actuator A.

The transmission circuit 4 modulates data for transmission (transmission data) to produce a transmission signal, and synthesizes the modulated transmission signal to produce a drive signal for drive control that is to be outputted to the actuator A. The transmission circuit 4 includes, for example, a data input circuit 16, a modulator 17, and a spectrum spreader 18.

The data input circuit 16, which is connected to the controller 6 and to the modulator 17, receives data (e.g., later-described module information) inputted from the controller 6, and outputs the received data to the modulator 17 as transmission data. The modulator 17 modulates the input data, and outputs the resulting modulated data. The modulator 17 is connected to the spectrum spreader 18. The spectrum spreader 18 extends the bandwidth of an input signal, and outputs the resulting signal as a transmission signal. The modulator 17 and the spectrum spreader 18 modulate the transmission data to produce a signal in a band different from a vibration band of the control target T, or more specifically, a signal in a band higher in frequency than the vibration band of the control target T (e.g., a frequency band higher than 1 kHz). That is, the transmission signal is different in frequency band from the earlier-described drive signal used for vibration control for the actuator A. A frequency band that is higher in frequency than the vibration band of the control target T and used for communication is hereinafter referred to as a communication band. The spectrum spreader 18 is connected to the earlier-described synthesis circuit 14.

The reception circuit 5 extracts a reception signal from the output signal of the sensor S (a transmission signal transmitted from a remote apparatus), and demodulates the extracted reception signal to produce reception data. The reception circuit 5 includes, for example, a communication band extraction circuit 19, a spectrum despreader 20, a demodulator 21, and a data output circuit 22.

The communication band extraction circuit 19 includes, for example, a high pass filter (HPF) and the like, extracts a communication band component from the output signal of the sensor S, and outputs the extracted frequency band component as a reception signal. That is, the communication band extraction circuit 19 plays a role of removing a signal unnecessary for data demodulation, or more specifically, a vibration noise signal. The communication band extraction circuit 19 is connected to the spectrum despreader 20.

The spectrum despreader 20 reduces the bandwidth of an input signal, and outputs the resulting signal. The spectrum despreader 20 is connected to the demodulator 21. The demodulator 21 demodulates an input signal, and outputs the resulting signal as reception data. It should be noted that the spectrum despreader 20 and the demodulator 21 perform processing corresponding (reverse) to the processing performed by the spectrum spreader 18 and the modulator 17, which are included in the transmission circuit 4. The demodulator 21 is connected to the data output circuit 22. The data output circuit 22, which is connected to the controller 6, outputs reception data inputted from the demodulator 21, to the controller 6.

The controller 6 includes, for example, a processor such as a DSP (Digital Signal Processor), an MPU (Micro-Processing Unit), or a CPU (Central Processing Unit). The controller 6, which is connected, for example, to each component element of the information processing apparatus 2, controls the overall operation of the information processing apparatus 2. That is, the controller 6 functions as a control circuit for controlling each component element of the information processing apparatus 2.

More specifically, the controller 6 is connected to the memory 7, and writes data into or reads data from the memory 7 as needed. Further, the controller 6 is connected to the transmission circuit 4 and controls transmission of transmission data performed by the transmission circuit 4. In addition, the controller 6 is connected to the reception circuit 5 and controls reception of reception data performed by the reception circuit 5. Moreover, the controller 6 is connected, for example, to the temperature sensor 8 and identifies, for instance, the status of the actuator A, the sensor S, a power supply, or a battery. Furthermore, the controller 6 is connected to the vibration control circuit 3 and controls the output adjustment amplifier 13.

More specifically, the controller 6 generates and stores the transmission data in collaboration with the memory 7. Further, the controller 6 plays a role of monitoring the status, for example, of the actuator A and the sensor S of a local apparatus and generating (including updating) a flag in a case of occurrence of an abnormality. In addition, the controller 6 controls the protection function (fail-safe function) of the apparatus according to the contents of transmission and reception. For example, the controller 6 assists the operation of a remote apparatus in which an abnormality has occurred (including the case where an abnormality is assumed to have occurred, such as the case where power is turned off) by increasing the output of the actuator A of the local apparatus. Moreover, in a case, for example, where an abnormality or the like is detected in the actuator A or the sensor S of the local apparatus, the controller 6 provides protection by decreasing the output of the actuator A or turning off the power.

The controller 6 provides various functions (e.g., later-described various operations), for example, by reading a program stored in the memory 7 and executing the program to perform various processes. It should be noted that the program may be, for example, stored in a remote storage apparatus, for example, in an external storage such as a USB memory, supplied through a network, or partially executed by a remote apparatus through the network.

The memory 7 includes, for example, a ROM (Read Only Memory), a RAM (Random Access Memory), or the like. The memory 7 stores, for example, a program read by the controller 6 to perform various processes and store data used in the various processes. For example, the memory 7 stores, for example, transmission data and reception data. The transmission data and the reception data include, for example, later-described module information. The memory 7 plays a role of storing information regarding the local apparatus and data received from a remote apparatus through vibrational communication. The temperature sensor 8 detects the temperature of the actuator A, and outputs the result of the detection as an output signal.

FIG. 5 is a diagram illustrating a structure example of the module information. The module information is information regarding each module (apparatus), that is, data regarding the local apparatus (the apparatus that has generated the module information). The module information includes, for example, an individual identification number (ID), a reception ID list, and various status flags. The module information is stored, for example, in the memory 7 and used, for instance, to optimize the overall vibration level during signal processing and provide fail-safe in an abnormal state. The module information is used, for example, as mutual information that is to be transmitted to and received from a remote apparatus.

The individual identification number is a number unique to each module, the number being determined during manufacture, unduplicable, and unchangeable. The reception ID list is a list of IDs of remote apparatuses that the local apparatus is able to communicate with. More specifically, the reception ID list includes fields that indicate recorded IDs of apparatuses having succeeded in transmission and reception and are initially blank.

The status flags are information indicating the status of an apparatus. The status flags include, for example, a "power on/off" flag and an abnormality flag. The "power on/off" flag indicates whether the remote apparatus is turned on or off. The abnormality flag indicates whether the state of the local apparatus is abnormal or not. The "power on/off" flag uses a binary representation method to indicate whether the power is turned on or off. For example, 0 indicates that the power is off, and 1 indicates that the power is on. It should be noted that, in a case where an apparatus turned on and ready for communication is turned off (e.g., in a case where the flag is changed from 1 (on) to 0 (off)), the present embodiment determines that an abnormality exists.

The abnormality flag uses a binary representation method to indicate whether each item is normal or abnormal. For example, 0 indicates that an item is normal, and 1 indicates that an item is abnormal. More specifically, the abnormality flag includes an "actuator excessive amplitude" flag and an "actuator abnormal heat generation" flag. The "actuator excessive amplitude" flag indicates whether or not the actuator A of the local apparatus is in an excessive amplitude state. The "actuator abnormal heat generation" flag indicates whether or not the actuator A of the local apparatus is in an abnormal heat generation state. Further, the abnormality flag includes a "sensor abnormality" flag and a "low battery level" flag. The "sensor abnormality" flag indicates whether or not the sensor S of the local apparatus is in an abnormal state. The "low battery level" flag indicates whether or not the battery level of the local apparatus is low.

The status flags described above are automatically set, for example, by the controller 6 of the local apparatus according to the status of the apparatus. For example, the controller 6 collects information regarding the apparatus, such as a power supply status, an amplitude status of the actuator A, a temperature status of the actuator A, a status of the sensor S, and a status of the battery, and determines the status flags according to the collected information regarding the apparatus. For example, the temperature status of the actuator A is determined based on an output signal of the temperature sensor 8.

[Operation Examples of Noise Control System]

"Initial Operation"

Figure 6:
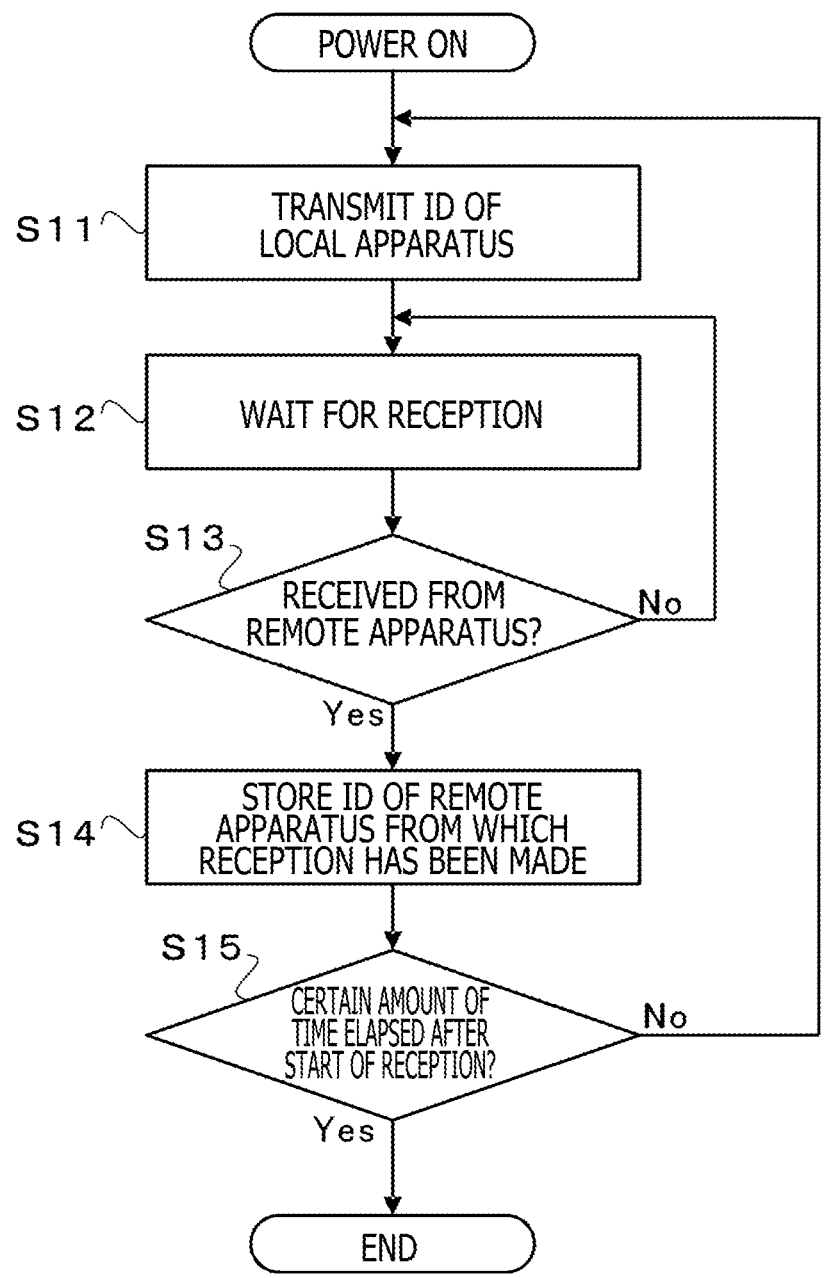
FIG. 6 is a flowchart illustrating an example of a flow of an initial operation.

FIG. 6 is a flowchart illustrating an example of a flow of an initial operation of the information processing apparatus 2. It should be noted that the order of operations (steps) described below can be changed as long as the individual operations remain unaffected. Upon starting an operation for being powered on, for instance, the information processing apparatus 2 transmits the ID of the local apparatus (step S11), and then waits for reception (step S12). More specifically, the information processing apparatus 2 transmits the ID by allowing the controller 6 to read the ID of the local apparatus from the memory 7 and output the read ID to the transmission circuit 4 as transmission data. The module information including the ID of the local apparatus may be transmitted.

Subsequently, in the above-mentioned state where reception is awaited, the information processing apparatus 2 determines whether or not data is received from a remote apparatus (step S13). More specifically, the controller 6 determines whether or not the transmission data transmitted from a remote apparatus is received by the reception circuit 5. It should be noted that the information processing apparatus 2 may determine whether the module information including the ID of a remote apparatus is received or determine whether the ID of a remote apparatus, the ID being transmitted from the remote apparatus in response to the transmission of the ID of the local apparatus, is received.

In a case where it is determined in step S13 that no transmission data is received ("No" in step S13), the processing returns to step S12. Meanwhile, in a case where it is determined in step S13 that the transmission data is received ("Yes" in step S13), the received ID of the remote apparatus is stored (more specifically, stored in the memory 7 as a reception ID) (step S14). This results in the recognition of the existence of a remote apparatus from which the local apparatus is able to receive the transmission data (the remote apparatus with which the local apparatus is able to communicate).

Next, the information processing apparatus 2 determines whether or not a certain amount of time has elapsed after the start of reception (step S15). In a case where it is determined in step S15 that the certain amount of time has not elapsed ("No" in step S15), the processing returns to step S11. That is, the information processing apparatus 2 checks again whether or not a remote apparatus from which the local apparatus is able to receive the transmission data exists. In a case where it is determined in step S15 that the certain amount of time has elapsed ("Yes" in step S15), the processing terminates. In the above-described manner, the remote apparatus is notified of the existence of the local apparatus, and the local apparatus recognizes the existence of the remote apparatus with which the local apparatus is able to communicate. The reception ID, which is set as described above, is used, for example, during a later-described transmission operation of the information processing apparatus 2.

"Vibration Control Operation (Vibration Control Process)"

Figure 7:
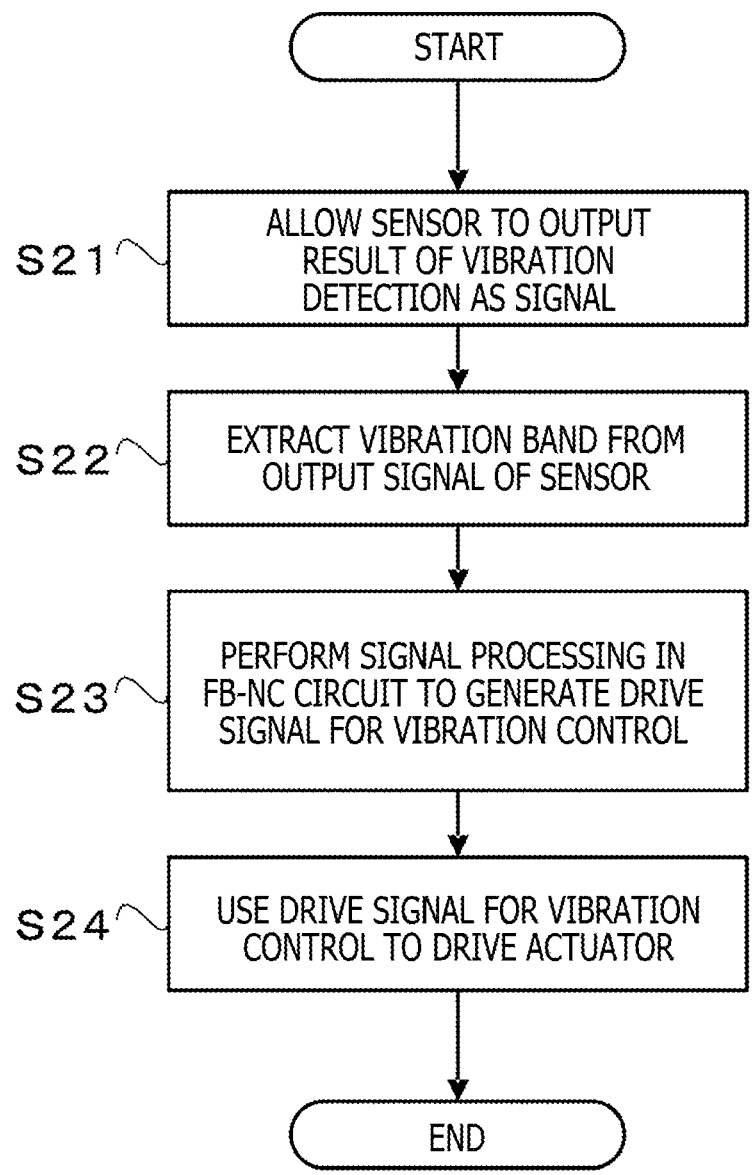
FIG. 7 is a flowchart illustrating an example of a flow of a vibration control operation.

FIG. 7 is a flowchart illustrating an example of a flow of a vibration control operation. The information processing apparatus 2 suppresses noise, for example, by controlling the vibration of the control target T in a manner described below. First of all, the sensor S outputs the result of vibration detection as a signal (step S21). For example, in a case where vibration noise is generated due, for instance, to an external factor, if the vibration noise propagates to the control target T, the sensor S detects the vibration of the vibration noise.

The output signal of the sensor S is inputted through the sensor output amplifier 11 to the vibration band extraction circuit 121, which is included in the FB-NC circuit 12 and includes, for example, an LPF and the like, and then the vibration band extraction circuit 121 extracts a vibration band component of the control target T from the input signal (step S22). The transmission signal from a remote apparatus, the transmission signal being included in the output signal of the sensor S, is in a band that is higher in frequency than the vibration noise. Therefore, the transmission signal is attenuated, for example, by a low-pass filter. That is, the band of a data signal is eliminated by the vibration band extraction circuit 121 at the first stage of the FB-NC circuit 12.

The signal extracted in the above manner is then inputted to the FB-NC signal processing circuit 122. According to the input signal, the FB-NC signal processing circuit 122 generates a drive signal for vibration control for the actuator A (more specifically, a cancelation signal for vibration cancelation) by performing vibration cancelation signal processing, for example, with the FB-NC digital filter (step S23). In the manner described above, the FB-NC circuit 12 does not process communication data and merely generates the drive signal for vibration control.

The drive signal generated in the above manner is then inputted to the actuator A through the output adjustment amplifier 13, the synthesis circuit 14, and the actuator drive amplifier 15 to drive the actuator A (step S24). Accordingly, the actuator A operates in such a manner as to cancel the vibration noise propagated to the control target T. As a result, the vibration of the control target T is controlled to suppress the noise.

"Transmission/Reception Operation (Transmission/Reception Process)"

The information processing apparatus 2 transmits and receives data by making use of vibration propagation of the control target T. As communication devices, the information processing apparatus 2 uses the actuator A for transmission purposes and uses the sensor S for reception purposes. However, the actuator A reproduces the drive signal for vibration control. Therefore, it is necessary to synthesize the data signal in such a manner as to avoid an adverse effect on vibration control (more specifically, vibration noise cancelation operation). In view of such circumstances, the information processing apparatus 2 prevents vibration control from interfering with noise suppression by using a data transmission band (communication band) higher in frequency than the vibration noise.

Figure 8:
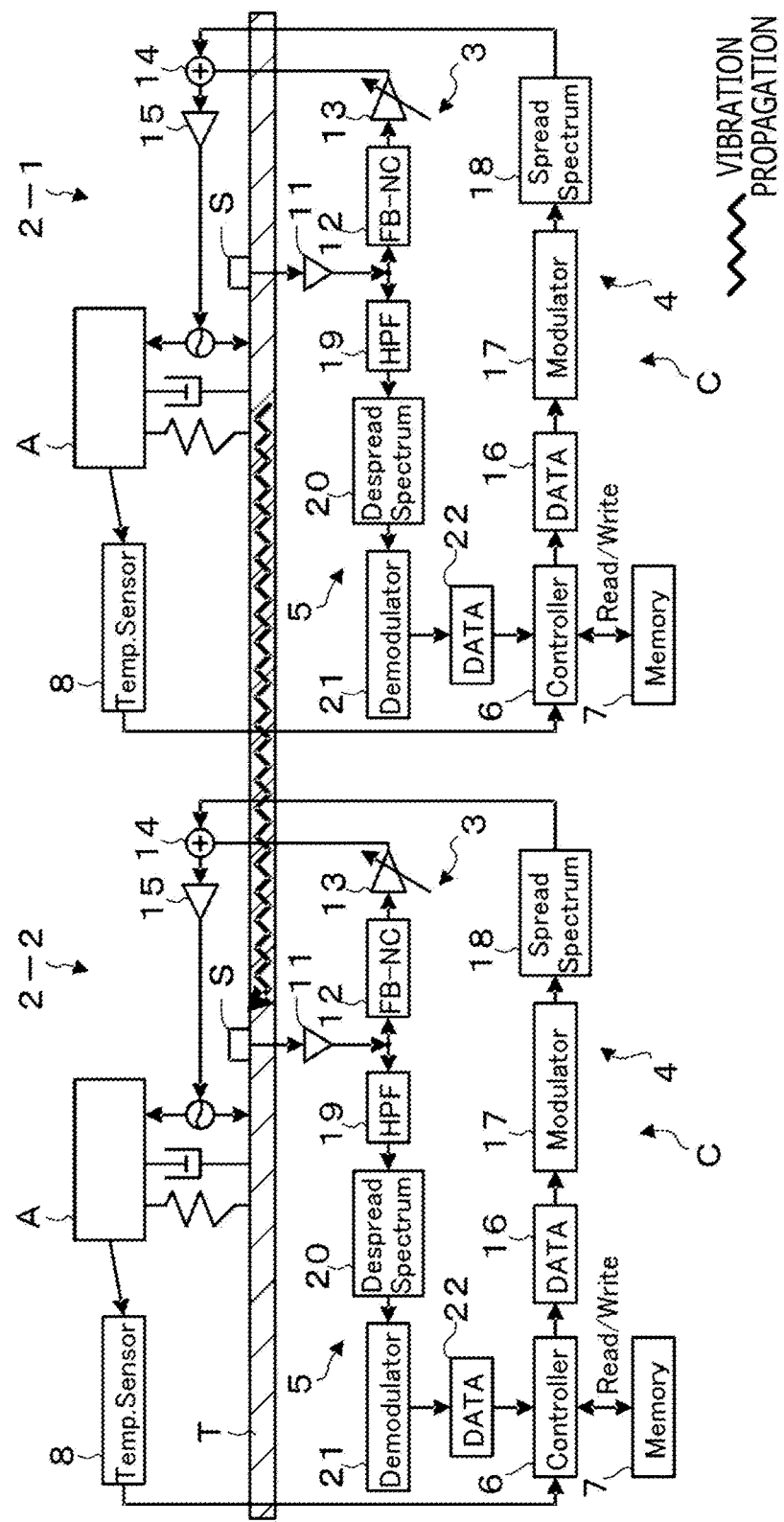
FIG. 8 is a diagram illustrating transmission and reception based on vibration propagation of a control target.
Figure 9:
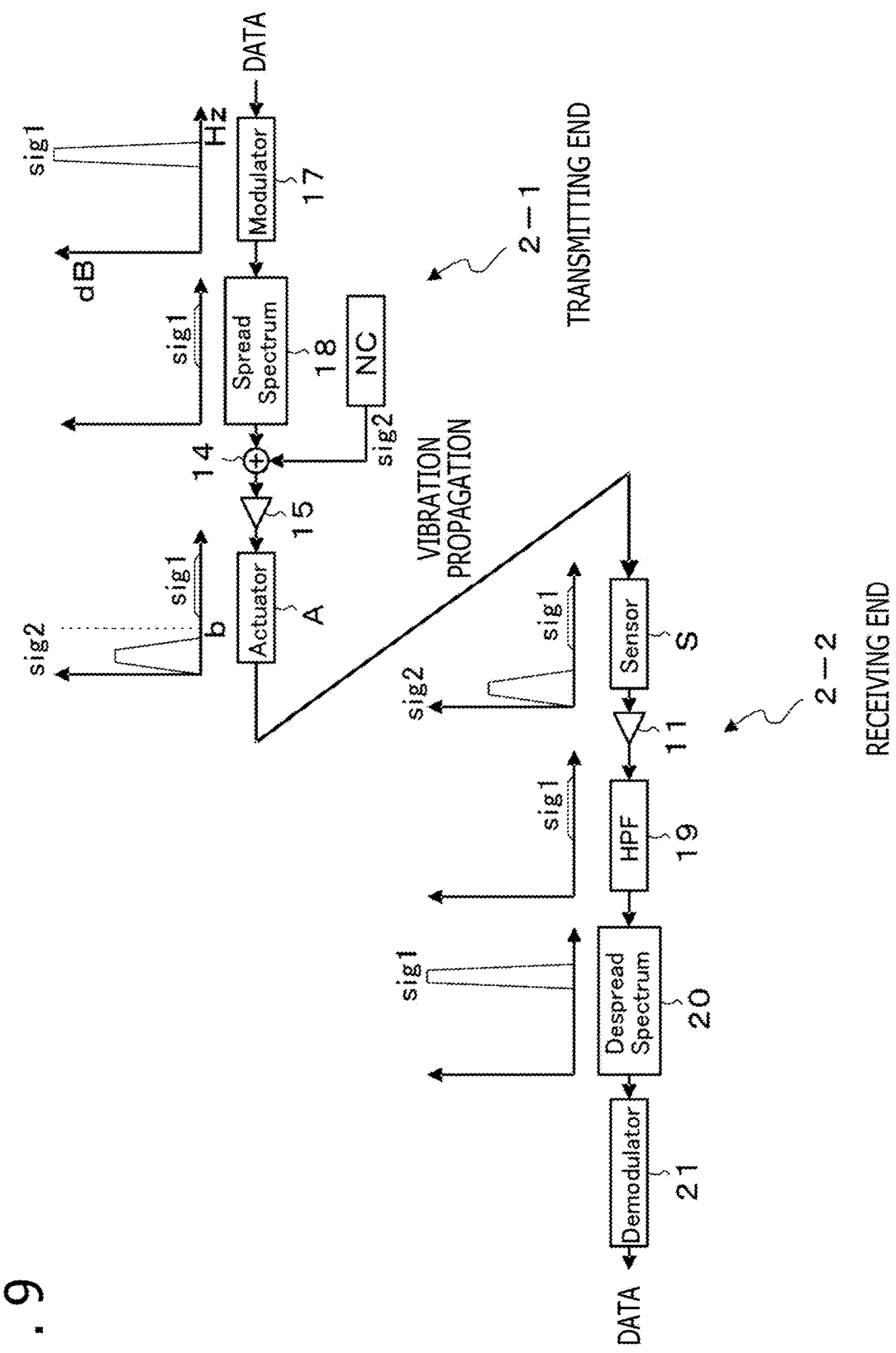
FIG. 9 is a diagram illustrating communication based on a spread spectrum method.

FIG. 8 is a diagram illustrating transmission and reception based on the vibration propagation of the control target T. FIG. 9 is a diagram illustrating spread spectrum communication. Transmission and reception by the information processing apparatus 2 will now be described with reference to FIGS. 8 and 9. It is to be noted that, in FIGS. 8 and 9, an information processing apparatus 2-1 represents the information processing apparatus 2 at a transmitting end and that an information processing apparatus 2-2 represents the information processing apparatus 2 at a receiving end. Further, in each graph depicted in FIG. 9, the horizontal axis represents a frequency (Hz), and the vertical axis represents a level (dB).

Figure 10:
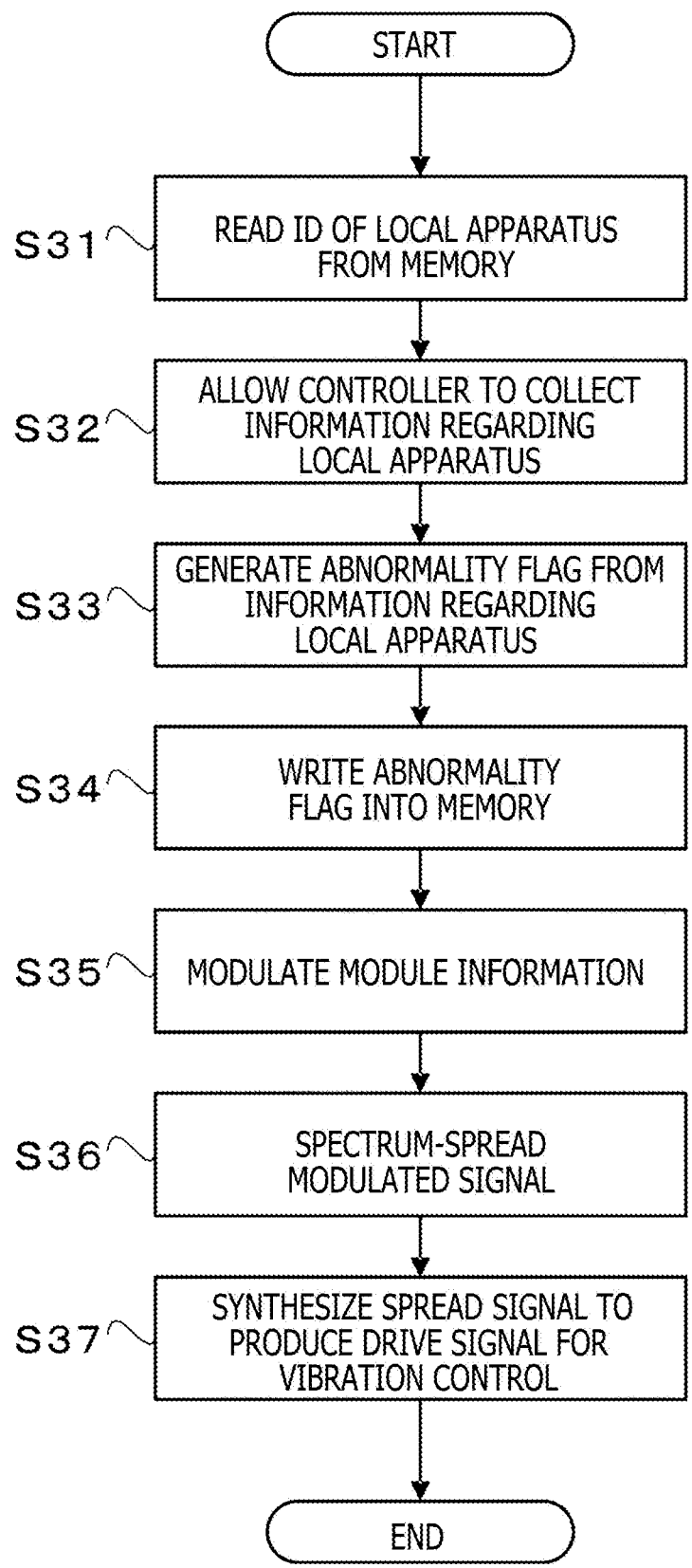
FIG. 10 is a flowchart illustrating an example of a flow of a transmission operation.

First of all, an operation example of data transmission is described below with reference to a flowchart depicted in FIG. 10. When transmitting data, the information processing apparatus 2 first reads the ID of the local apparatus from the memory 7 (step S31). Next, the information processing apparatus 2 allows the controller 6 to collect information regarding the local apparatus (step S32). The information collected in this manner includes, for example, the above-mentioned information indicating the power supply status, the amplitude status of the actuator A, the temperature status of the actuator A, the status of the sensor S (e.g., the output signal of the sensor S), the status of the battery, and the like.

Next, the information processing apparatus 2 generates the status flags including the abnormality flag from the information regarding the local apparatus (step S33). Then, the information processing apparatus 2 writes the generated status flags including the abnormality flag into the memory (step S34). As mentioned earlier, the value of the abnormality flag is, for example, 0 (normal) or 1 (abnormal). In the above-described manner, the information processing apparatus 2 generates or updates the module information. It should be noted that the information processing apparatus 2 updates the module information in a case, for example, where the contents are changed.

Next, the information processing apparatus 2 outputs the module information, as the transmission data, from the controller 6 to the data input circuit 16 in the transmission circuit 4, and allows the modulator 17 to modulate the transmission data (step S35). More specifically, the modulator 17 modulates the transmission data to produce a high-frequency band signal (data signal sig1), as depicted in FIG. 9.

The signal produced by the above modulation is then inputted to the spectrum spreader 18 to let the spectrum spreader 18 expand (spectrum-spread) the band of the input signal (step S36). More specifically, as depicted in FIG. 9, the spectrum spreader 18 converts the input signal (data signal sig1) at a low level to a broadband signal. The resulting spectrum-spread signal is then inputted to the synthesis circuit 14, and, as depicted in FIG. 9, the synthesis circuit 14 combines the input signal (data signal sig1) with the drive signal (drive signal sig2) for vibration control for the actuator A, the drive signal being generated by the vibration control circuit 3 (step S37). In this instance, the combined signals do not interfere with each other because, as depicted in FIG. 9, the vibration band of the control target T differs from the communication band for data transmission (the band of the data signal sig1). A boundary b between the vibration band and the communication band is set, for example, at 1 kHz. Therefore, as depicted in FIG. 8, the transmission signal from the information processing apparatus 2-1 is vibrationally propagated to the control target T, and transmitted, as a vibration, to the remote information processing apparatus 2-2. It should be noted that, in the above instance, the module information is transmitted to each of remote apparatuses that are communicable according to the reception ID list. As described above, in a case, for example, where an abnormality in the local apparatus is detected, the transmission operation is used to notify the remote apparatus of the abnormality.

Figure 11:
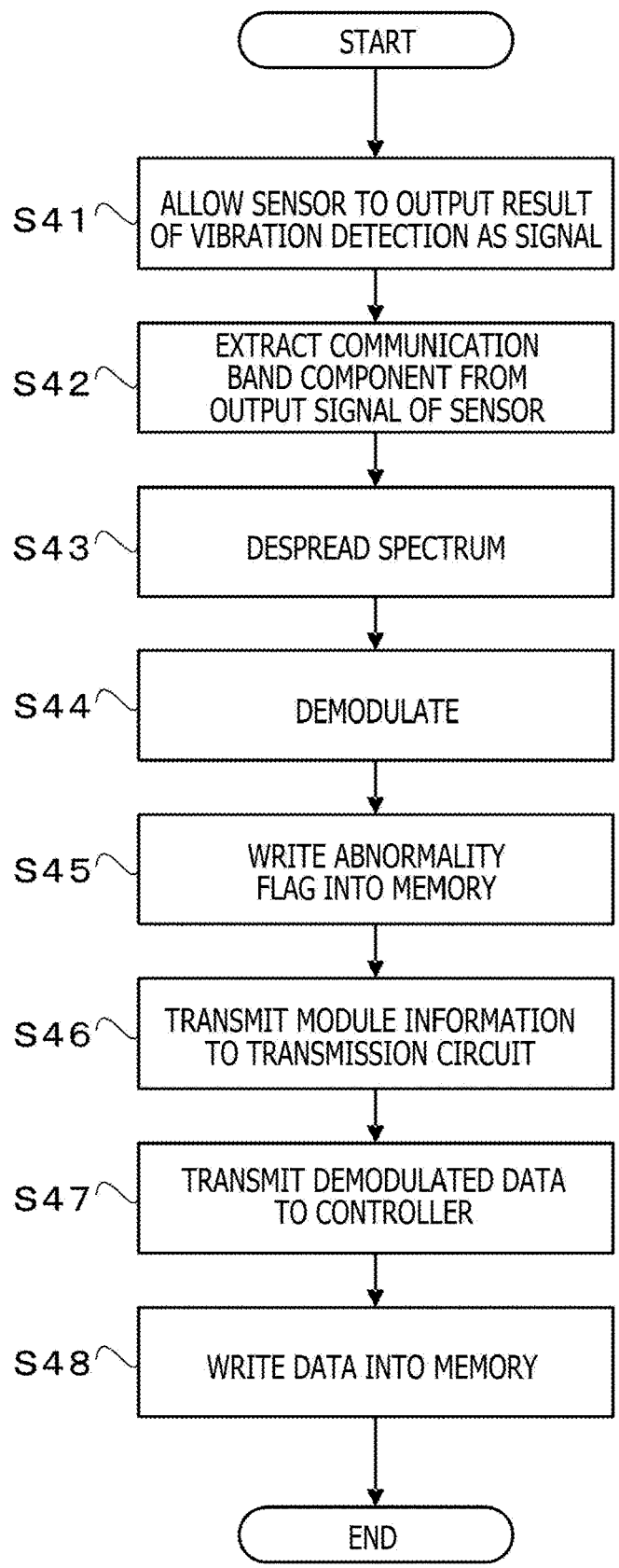
FIG. 11 is a flowchart illustrating an example of a flow of a reception operation.

An operation example of data reception will now be described with reference to a flowchart depicted in FIG. 11. A data signal transmitted from the information processing apparatus 2-1 is propagated, as a vibration, through the control target T on which the information processing apparatus 2-2 is mounted, and detected by the sensor S of the information processing apparatus 2-2. In the case of data reception, first of all, the sensor S outputs the result of vibration detection as a signal (step S41). The output signal of the sensor S is then amplified by the sensor output amplifier 11 and inputted to the communication band extraction circuit 19, which is a branch destination, and the communication band extraction circuit 19 extracts a communication band component from the input signal (step S42).

More specifically, the communication band extraction circuit 19 extracts a transmission signal (data signal sig1) by removing a vibration band component, for example, with a high-pass filter as depicted in FIG. 9. The extracted transmission signal is then inputted to the spectrum despreader 20, and the spectrum despreader 20 reduces the bandwidth (despread the spectrum) of the input signal (step S43). The resulting spectrum-despread signal (data signal sig1) is inputted to the demodulator 21, and the demodulator 21 demodulates the input signal to produce reception data (step S44). In the above-described manner, the transmission data transmitted from the information processing apparatus 2-1 is restored as the reception data in the information processing apparatus 2-2.

Subsequently, the status flags including the abnormality flag are generated from the information regarding the local apparatus, and then the generated status flags including the abnormality flag are written into the memory (step S45). Next, the controller 6 outputs the module information, as the transmission data, to the transmission circuit 4, and then the transmission circuit 4 transmits the module information to the information processing apparatus 2-1 (step S46) in a manner similar to the one in the above-described case. As a result, the information processing apparatus 2-1 and the information processing apparatus 2-2 are able to share the module information with each other.

Meanwhile, the reception data produced by demodulation as mentioned earlier, that is, the module information regarding the information processing apparatus 2-1, is transmitted to the controller 6 (step S47), and then the controller 6 writes the transmitted data into the memory 7 (step S48). Upon completion of step S48, the reception operation terminates.

"Fail-Safe Operation (Fail-Safe Process)"

Figure 12:
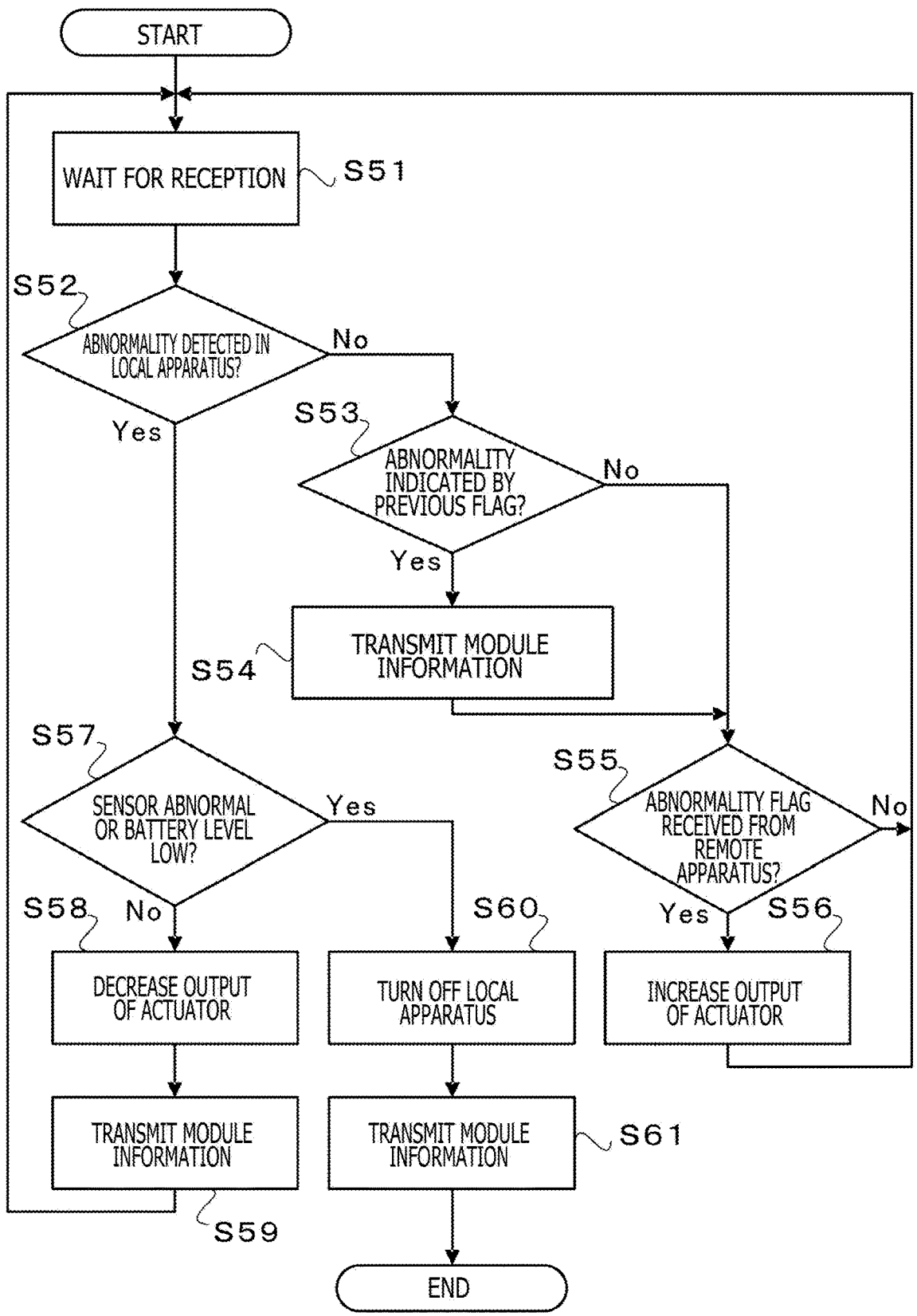
FIG. 12 is a flowchart illustrating an example of a flow of a fail-safe operation.

FIG. 12 is a flowchart illustrating an example of a flow of a fail-safe operation. First of all, the information processing apparatus 2 is in a state where it waits for reception (step S51), and then determines whether or not any abnormality is detected in the local apparatus (step S52). This determination is made by the controller 6 on the basis of, for example, the information regarding the apparatus, such as the power supply status, the amplitude status of the actuator A, the temperature status of the actuator A, the status of the sensor S, and the status of the battery.

In a case where it is determined in step S52 that no abnormality is detected (No), the information processing apparatus 2 determines whether or not an abnormality is indicated by the previous flag (step S53). That is, the information processing apparatus 2 determines whether it has recovered from an abnormal state and changed the abnormality flag or has been remaining in a normal state. In a case where it is determined in step S53 that an abnormality is indicated by the previous flag (Yes), the information processing apparatus 2 transmits the module information regarding the local apparatus to a remote apparatus to notify the remote apparatus that the local apparatus has returned to the normal state from the abnormal state (step S54). For example, since the abnormality is cleared, the abnormality flag is updated from 1 to 0 and transmitted together with the ID of the local apparatus. It should be noted that only a changed flag may be transmitted together with the ID of the local apparatus. This similarly applies to the other operations. As a result, the amount of transmission data can be reduced.

In a case where it is determined after processing in step S54 or in step S53 that no abnormality is indicated by the previous flag, that is, a normal state is continuously indicated (No), the information processing apparatus 2 determines whether or not an abnormality flag is received from the remote apparatus (step S55). In a case where it is determined in step S55 that no abnormality flag is received (No), the processing returns to step S51 in which the information processing apparatus 2 waits for reception. Meanwhile, in a case where it is determined in step S55 that the abnormality flag is received (Yes), the information processing apparatus 2 determines that the reception data includes data indicating an abnormality of the remote apparatus, and then the controller 6 controls the output adjustment amplifier 13 to increase the output of the actuator A, that is, the gain of the actuator A (step S56). The degree of such increase is determined based, for example, on the status of the actuator A of the local apparatus. As a result, in a case where the remote apparatus is in an abnormal state, the local apparatus is able to assist the operation of the remote apparatus as long as the local apparatus can afford to assist.

Meanwhile, in a case where it is determined in step S52 that an abnormality is detected in the local apparatus (Yes), the information processing apparatus 2 determines whether or not the type of abnormality is a sensor abnormality or a low battery level (step S57). In a case where it is determined in step S57 that the type of abnormality is neither the sensor abnormality nor the low battery level (No), the information processing apparatus 2 determines that the type of abnormality is an excessive amplitude of the actuator A or abnormal heat generation by the actuator A, and then the controller 6 controls the output adjustment amplifier 13 to decrease the output of the actuator A (step S58). Subsequently, the information processing apparatus 2 transmits the module information including the ID of the local apparatus and the abnormality flag (step S59), and then returns the processing to step S51. The output of the actuator A is decreased because it is considered that decreasing its output allows the information processing apparatus 2 to return to a normal state. That is, since the actuator A is protected upon occurrence of an abnormality, the abnormality flag is updated from 0 to 1 and then transmitted.

Meanwhile, in a case where it is determined in step S57 that the type of abnormality is either the sensor abnormality or the low battery level (Yes), the information processing apparatus 2 determines that it does not improve to a normal state, exercises control to turn off the local apparatus (step S60), transmits the module information including the ID of the local apparatus and power-off information (step S61), and terminates the processing.

As described above, in the fail-safe operation, an apparatus within the communication range increases its output to assist the operation of an apparatus in which abnormality has occurred. A nearby apparatus should preferably compensate for a decrease in the output of an apparatus in which abnormality has occurred. Therefore, it is not always necessary to be able to communicate with all the apparatuses.

[Application Aspects of Noise Control System]

Figure 13:
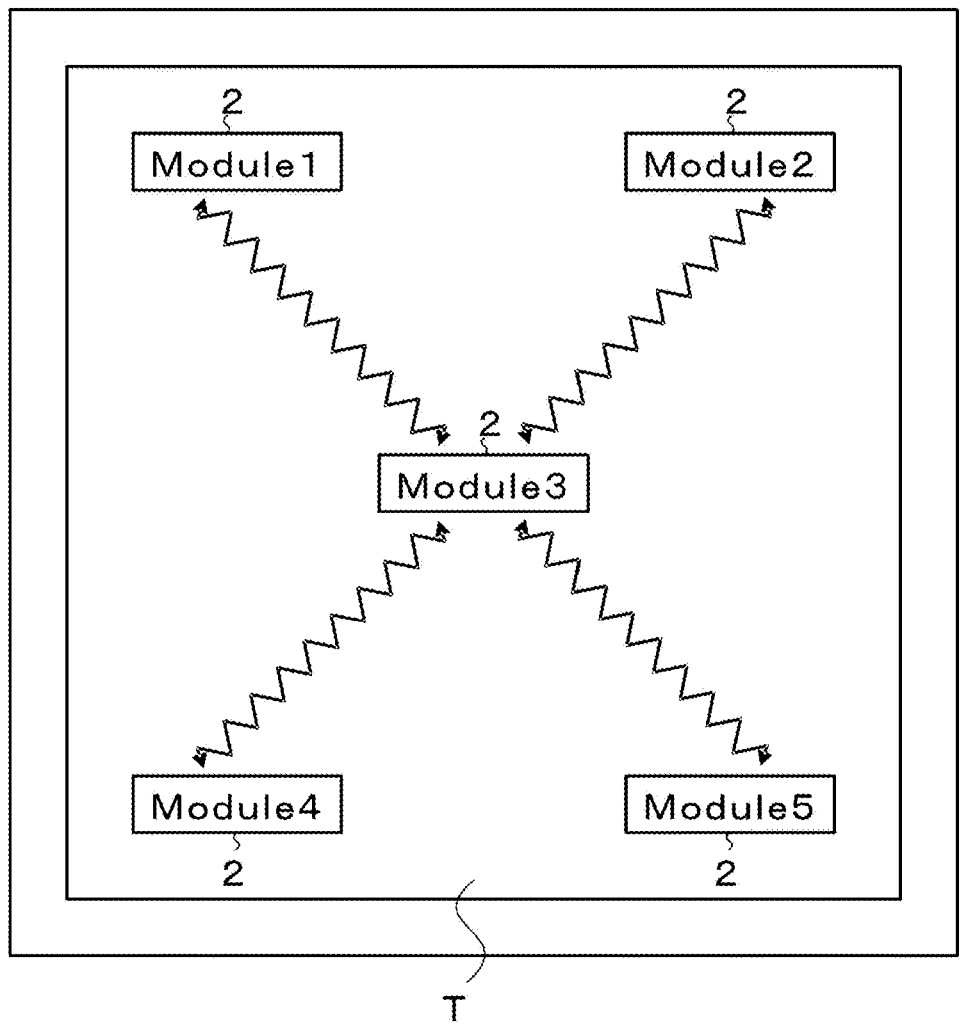
FIG. 13 is a diagram illustrating an example in which the noise control system is applied to a window.

Examples of application aspects of the noise control system 1 are described below. FIG. 13 is a diagram illustrating an example in which the noise control system 1 is applied to a window. In the illustrated example, five information processing apparatuses 2 (modules 1 to 5) are mounted at intervals on a piece of window (more specifically, a window glass) that is regarded as the control target T. More specifically, the information processing apparatuses 2 are used while they are attached to the window. The information processing apparatuses 2 not only suppress the vibration of the window, but also vibrationally communicate with a nearby information processing apparatus 2 via the window as depicted in FIG. 13. It should be noted that the information processing apparatuses 2 need not always be evenly spaced from each other as depicted in FIG. 13. It is sufficient if the information processing apparatuses 2 are disposed in such a manner that vibration involved in vibrational communication propagates to remote information processing apparatuses 2. This ensures that data can be transmitted and received between adjacent information processing apparatuses 2.

Figure 14:
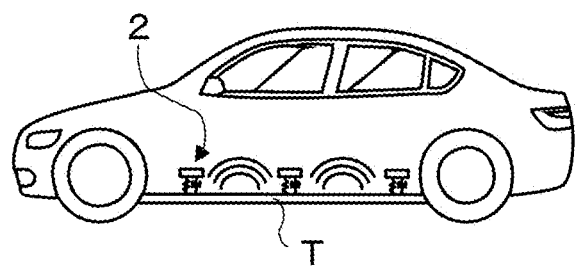
FIG. 14 is a diagram illustrating an example in which the noise control system is applied to an automobile.

FIG. 14 is a diagram illustrating an example in which the noise control system 1 is applied to an automobile. In the illustrated example, a panel of the automobile is regarded as the control target T, and the information processing apparatuses 2 each including the actuator A are mounted on the panel of the automobile. This makes it possible to reduce noise, called road noise, which is generated by vibration from a road surface, by utilizing the information processing apparatuses 2 attached to the panel. In addition, vibrational communication can be established through a housing of the automobile. Although the illustrated example indicates that the information processing apparatuses 2 are mounted on a floor panel of the automobile, the information processing apparatuses 2 may be mounted, for example, on a window glass, a door pillar, or any other interior of the automobile. Further, the noise control system 1 may also be applied to a movable body such as a vehicle other than an automobile.

As described above, the noise control system 1 uses the actuator A and the sensor S to enable the information processing apparatuses 2 to establish vibration-based communication with each other. More specifically, the actuator A for vibration control outputs a vibration on which a data signal is superimposed, and then the sensor S for vibration control, the sensor S being attached to a remote apparatus, establishes vibrational communication by detecting the vibration and extracting the data signal. Therefore, inter-apparatus communication can be established without having to use a cable for communication with a wired connection or incorporate hardware dedicated to communication, such as a communication module, for communication with a wireless connection. As a result, the communication environment can be built in a satisfactory manner.

Further, the data signal is superimposed on the out-of-band portion of the drive signal for the actuator A, which is used to exercise noise control based on vibration control by using a spread spectrum method. That is, the drive signal for vibration control and the transmission signal differ in frequency band. More specifically, it is possible to prevent vibration control from interfering with noise control by making the band used for communication higher in frequency than the band of vibration noise. In addition, using the spread spectrum method for modulation and demodulation not only provides high interference immunity, but also reduces the possibility of causing annoyance to the human ear.

Moreover, using the function of establishing communication between the information processing apparatuses 2 makes it possible to implement a protection function that allows a remote apparatus to assist the operation of a specific apparatus which is in an abnormal state.

In addition, dispersedly disposing multiple actuators A on the control target T makes it possible to efficiently suppress various vibration modes possessed by an object.

2. Second Embodiment

Figure 15:
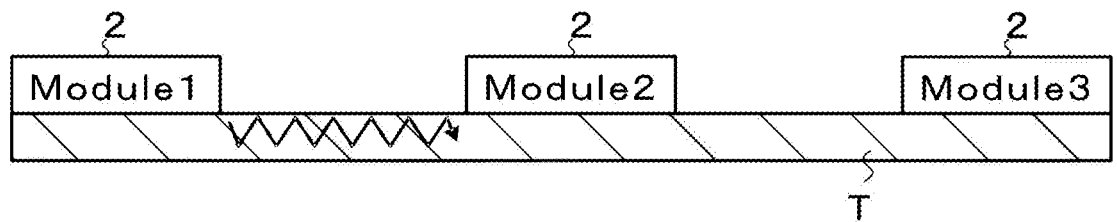
FIG. 15 is a diagram illustrating data transmission in a case where an information processing apparatus does not act as a relay.
Figure 16:
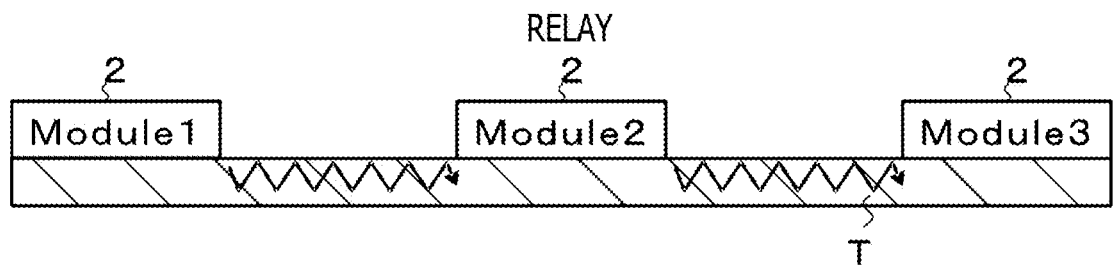
FIG. 16 is a diagram illustrating data transmission in a case where the information processing apparatus acts as a relay.

The first embodiment has been described above with reference to a case where data is transmitted and received between the information processing apparatuses 2 to which vibration propagates. However, the information processing apparatus 2 may also be used as a relay. FIG. 15 is a diagram illustrating data transmission in a case where the information processing apparatus 2 does not act as a relay. Further, FIG. 16 is a diagram illustrating data transmission in a case where the information processing apparatus 2 acts as a relay. In a case where the information processing apparatus 2 does not act as a relay as depicted in FIG. 15, transmission from the module 1 reaches the module 2, but not the module 3 due to the absence of a relay. Meanwhile, in a case where the information processing apparatus 2 doubles as a relay as depicted in FIG. 16, the modules 1 and 3 are able to communicate with each other because the module 2 acts as a relay.

In a case where the information processing apparatus 2 is used as a relay, it is sufficient if a relay flag (e.g., 0: data not transmitted through the relay, 1: data transmitted through the relay) is added to the module information used as transmission and reception data depicted in FIG. 4. It should be noted that the second embodiment is similar to the above-described first embodiment except that the information processing apparatus 2 according to the first embodiment is used also as a relay. Therefore, here, for example, the configuration of the information processing apparatus 2 will not be redundantly described.

Figure 17:
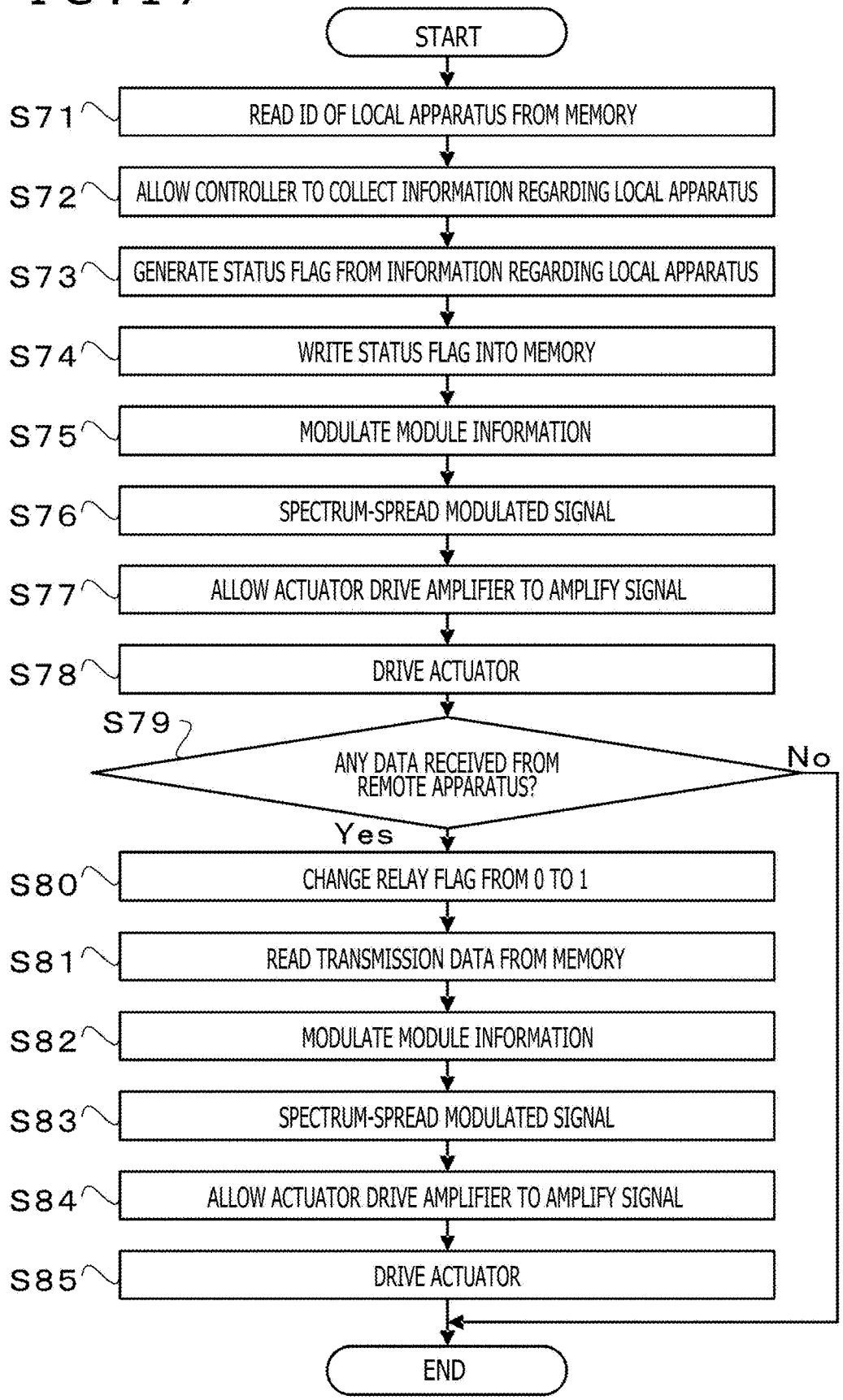
FIG. 17 is a flowchart illustrating an example of a flow of a transmission operation that is performed by the relay.

FIG. 17 is a flowchart illustrating an example of a flow of a transmission operation that is performed by the relay. First of all, the information processing apparatus 2 reads the ID of the local apparatus from the memory 7 (step S71). Next, the information processing apparatus 2 allows the controller 6 to collect information regarding the local apparatus (step S72). Subsequently, the information processing apparatus 2 generates the abnormality flag from the information regarding the local apparatus (step S73), and writes the generated abnormality flag into the memory 7 (step S74).

Subsequently, the information processing apparatus 2 generates the module information, allows the transmission circuit 4 to modulate the generated module information (step S75), and spectrum-spreads a signal produced by modulation (step S76). Next, the information processing apparatus 2 allows the synthesis circuit 14 to combine the spectrum-spread signal with the drive signal for vibration control for the actuator A, then allows the actuator drive amplifier 15 to amplify the resulting signal (step S77), and drives the actuator A with the amplified signal (step S78). In the above-described manner, the module information regarding the local apparatus is transmitted.

Next, the information processing apparatus 2 determines whether or not data is received from a remote apparatus (step S79). For example, the information processing apparatus 2 allows the controller 6 to determine whether or not received data is stored in the memory 7. In a case where it is determined in step S79 that no data is received from a remote apparatus (No), the processing terminates. On the other hand, in a case where it is determined in step S79 that data is received from a remote apparatus (Yes), the information processing apparatus 2 changes the relay flag from 0 to 1 (step S80), and reads the received data from the memory 7 as the transmission data (step S81). Subsequently, the information processing apparatus 2 generates the module information, then allows the transmission circuit 4 to modulate the generated module information (step S82), and spectrum-spreads the modulated module information (step S83). Next, the information processing apparatus 2 allows the synthesis circuit 14 to combine the spectrum-spread signal with the drive signal for vibration control for the actuator A, then allows the actuator drive amplifier 15 to amplify the resulting signal (step S84), and drives the actuator A with the amplified signal (step S85). As described above, in the second embodiment, the reception data is transmitted, as the transmission data, to an apparatus other than an apparatus having transmitted the reception data to the local apparatus. This makes it possible to use the information processing apparatus 2 as a relay between the remote apparatuses.

Consequently, even between the remote apparatuses outside the communication range, the information processing apparatus 2 can be used as a relay to establish communication and share data.

3. Modifications

While the embodiments of the present disclosure have been described above in detail, it should be understood that the present disclosure is not limited to the foregoing embodiments and that various modifications can be made based on the technical idea of the present disclosure. For example, various modifications described below can be made. Further, any one or more aspects of modifications that are freely selected and described below can be combined with each other as appropriate. In addition, for example, configurations, methods, processes, shapes, materials, and numerical values mentioned in conjunction with the foregoing embodiments can be combined with each other without departing from the spirit of the present disclosure. Moreover, an individual part can be divided into two or more subparts.

For example, the module information is illustrated as the transmission data (reception data) in conjunction with the foregoing embodiments. However, the transmission data (reception data) is not limited to the module information.

The transmission data (reception data) can be determined as appropriate based, for example, on the functions possessed by an apparatus.

Further, for example, the information processing apparatus 2 that performs both the transmission operation and the reception operation is illustrated in conjunction with the foregoing embodiments. However, the information processing apparatus 2 may be configured to perform only the transmission operation or only the reception operation.

It is to be noted that the present disclosure can also adopt the following configurations.

(1)
An information processing apparatus including:
a sensor that detects vibration of a control target;
an actuator that provides vibration control of the control target;
a vibration control circuit that generates a drive signal for the vibration control for the actuator according to an output signal of the sensor and outputs the generated drive signal to the actuator;
a transmission circuit that modulates transmission data to produce a transmission signal and synthesizes the modulated transmission signal to produce the drive signal for the vibration control that is to be outputted to the actuator; and
a reception circuit that extracts a reception signal from the output signal of the sensor and demodulates the extracted reception signal to produce reception data.

(2)
The information processing apparatus according to (1), in which the drive signal for the vibration control and the transmission signal differ in frequency band.

(3)
The information processing apparatus according to (1) or (2), in which the transmission signal and the reception signal are in a higher frequency band than a vibration frequency band of the control target.

(4)
The information processing apparatus according to any one of (1) to (3), in which the modulation and the demodulation use a spread spectrum method.

(5)
The information processing apparatus according to any one of (1) to (4), in which the vibration control circuit includes a vibration band extraction circuit for extracting a vibration frequency band component of the control target from the output signal of the sensor.

(6)
The information processing apparatus according to any one of (1) to (5), in which the sensor includes an acceleration sensor, and the output signal of the sensor includes an acceleration signal.

(7)
The information processing apparatus according to any one of (1) to (6), in which the transmission data includes data regarding a local apparatus.

(8)
The information processing apparatus according to any one of (1) to (7), in which a gain of the drive signal for the vibration control increases in a case where the reception data includes data indicating an abnormality of a remote apparatus.

(9)
The information processing apparatus according to (8), in which the data indicating the abnormality includes data indicating an abnormal temperature of the actuator, an excessive amplitude of the actuator, an abnormality of the sensor, or a low battery level.

(10)
The information processing apparatus according to any one of (1) to (9), in which the gain of the drive signal for the vibration control decreases when an abnormal temperature of the actuator of the local apparatus or an excessive amplitude of the actuator is detected.

(11)
The information processing apparatus according to any one of (1) to (10), in which the local apparatus is turned off when an abnormality of the sensor or a low battery level of the local apparatus is detected.

(12)
The information processing apparatus according to any one of (1) to (11), further including:
a portable housing.

(13)
The information processing apparatus according to any one of (1) to (12), further including:
a housing to be mounted on a window.

(14)
The information processing apparatus according to any one of (1) to (13), further including:
a housing to be mounted on a movable body.

(15)
The information processing apparatus according to any one of (1) to (14), in which the information processing apparatus is used as a relay for transmitting the reception data, as the transmission data, to an apparatus other than an apparatus having transmitted the reception data.

(16)
An information processing apparatus including:
a sensor that detects vibration of a control target;
an actuator that provides vibration control of the control target;
a vibration control circuit that generates a drive signal for the vibration control for the actuator according to an output signal of the sensor and outputs the generated drive signal to the actuator; and
a transmission circuit that modulates transmission data to produce a transmission signal and synthesizes the modulated transmission signal to produce the drive signal for the vibration control that is to be outputted to the actuator.

(17)
An information processing apparatus including:
a sensor that detects vibration of a control target;
an actuator that provides vibration control of the control target;
a vibration control circuit that generates a drive signal for the vibration control for the actuator according to an output signal of the sensor and outputs the generated drive signal to the actuator; and
a reception circuit that extracts a reception signal from the output signal of the sensor and demodulates the extracted reception signal to produce reception data.

(18)
An information processing method including:
a vibration control process of generating a drive signal for vibration control for an actuator according to an output signal of a sensor and outputting the generated drive signal to the actuator, the sensor detecting vibration of the control target, the actuator providing the vibration control of the control target;
a transmission process of modulating transmission data to produce a transmission signal and synthesizing the modulated transmission signal to produce the drive signal for the vibration control that is to be outputted to the actuator; and a reception process of extracting a reception signal from the output signal of the sensor and demodulating the extracted reception signal to produce reception data.

(19)

A program for causing a computer to execute an information processing method including:

a vibration control process of generating a drive signal for vibration control for an actuator according to an output signal of a sensor and outputting the generated drive signal to the actuator, the sensor detecting vibration of the control target, the actuator providing the vibration control of the control target;

a transmission process of modulating transmission data to produce a transmission signal and synthesizing the modulated transmission signal to produce the drive signal for the vibration control that is to be outputted to the actuator; and a reception process of extracting a reception signal from the output signal of the sensor and demodulating the extracted reception signal to produce reception data.

REFERENCE SIGNS LIST

1: Noise control system
2, 2-1, 2-2: Information processing apparatus
3: Vibration control circuit
4: Transmission circuit
5: Reception circuit
6: Controller
7: Memory
12: FB-NC circuit
13: Output adjustment amplifier
14: Synthesis circuit
17: Modulator
18: Spectrum spreader
19: Communication band extraction circuit
20: Spectrum despreader
21: Demodulator
121: Vibration band extraction circuit
A: Actuator
S: Sensor
T: Control target

The invention claimed is:

1. An information processing apparatus, comprising:
a sensor configured to:
    detect vibration of a control target; and
    output an output signal based on the detected vibration;
an actuator configured to control the vibration of the control target;
a vibration control circuit configured to:
    generate, based on the output signal of the sensor, a drive signal for the actuator for the control of the vibration; and
    output the generated drive signal to the actuator;
a transmission circuit configured to:
    modulate transmission data to produce a transmission signal; and
    synthesize the transmission signal to produce the drive signal for the actuator; and
a reception circuit configured to:
    extract a reception signal from the output signal of the sensor; and
    demodulate the extracted reception signal to produce reception data.

2. The information processing apparatus according to claim 1, wherein a frequency band of the drive signal is different from a frequency band of the transmission signal.

3. The information processing apparatus according to claim 1, wherein the transmission signal and the reception signal are in a higher frequency band than a vibration frequency band of the control target.

4. The information processing apparatus according to claim 1, wherein the modulation and the demodulation are based on a spread spectrum method.

5. The information processing apparatus according to claim 1, wherein the vibration control circuit includes a vibration band extraction circuit configured to extract a vibration frequency band component of the control target from the output signal of the sensor.

6. The information processing apparatus according to claim 1, wherein
    the sensor includes an acceleration sensor, and
    the output signal of the sensor includes an acceleration signal.

7. The information processing apparatus according to claim 1, wherein the transmission data includes data regarding a local apparatus.

8. The information processing apparatus according to claim 1, wherein a gain of the drive signal increases in a case where the reception data includes data indicating an abnormality of a remote apparatus.

9. The information processing apparatus according to claim 8, wherein the data indicating the abnormality includes data indicating at least one of an abnormal temperature of the actuator, an excessive amplitude of the actuator, an abnormality of the sensor, or a low battery level.

10. The information processing apparatus according to claim 1, wherein a gain of the drive signal decreases based on at least one of an abnormal temperature of the actuator or an excessive amplitude of the actuator.

11. The information processing apparatus according to claim 1, wherein a local apparatus is turned off based on at least one of an abnormality of the sensor or a low battery level of the local apparatus.

12. The information processing apparatus according to claim 1, further comprising a portable housing attachable to the control target.

13. The information processing apparatus according to claim 1, further comprising a housing mountable on the control target, wherein the control target corresponds to a window.

14. The information processing apparatus according to claim 1, further comprising a housing mountable on the control target, wherein the control target corresponds to a movable body.

15. The information processing apparatus according to claim 1, wherein
    the information processing apparatus is configured to be used as a relay to transmit the reception data, as the transmission data, to a first apparatus, and
    the first apparatus is different from a second apparatus that has transmitted the reception data.

16. An information processing apparatus, comprising:
a sensor configured to:
    detect vibration of a control target; and
    output an output signal based on the detected vibration;
an actuator configured to control the vibration of the control target;

a vibration control circuit configured to:
generate, based on the output signal of the sensor, a drive signal for the actuator for the control of the vibration; and
output the generated drive signal to the actuator; and
a transmission circuit configured to:
modulate transmission data to produce a transmission signal having a frequency band different from a frequency band of the drive signal; and
synthesize the modulated transmission signal to produce the drive signal for the actuator.

17. An information processing apparatus, comprising:
a sensor configured to:
detect vibration of a control target; and
output an output signal based on the detected vibration;
an actuator configured to control the vibration of the control target;
a vibration control circuit configured to:
generate, based on the output signal of the sensor, a drive signal for the actuator for the control of the vibration; and
output the generated drive signal to the actuator; and
a reception circuit configured to:
extract a reception signal from the output signal of the sensor; and
demodulates the extracted reception signal to produce reception data.

18. An information processing method, comprising:
detecting, by a sensor, vibration of a control target;
outputting, by the sensor, an output signal based on the detected vibration;
generating, based on the output signal of the sensor, a drive signal for an actuator for control of the vibration;
outputting the generated drive signal to the actuator;
controlling, by the actuator, the vibration of the control target based on the drive signal;
modulating transmission data to produce a transmission signal;
synthesizing the modulated transmission signal to produce the drive signal for the actuator;
extracting a reception signal from the output signal of the sensor; and
demodulating the extracted reception signal to produce reception data.

19. A non-transitory computer-readable medium having stored thereon, computer-executable instructions which, when executed by a computer, cause the computer to execute operations, the operations comprising:
detecting, by a sensor, vibration of a control target;
outputting, by the sensor, an output signal based on the detected vibration;
generating, based on the output signal of the sensor, a drive signal for an actuator for control of the vibration;
outputting the generated drive signal to the actuator;
controlling, by the actuator, the vibration of the control target based on the drive signal;
modulating transmission data to produce a transmission signal;
synthesizing the modulated transmission signal to produce the drive signal for the actuator;
extracting a reception signal from the output signal of the sensor; and
demodulating the extracted reception signal to produce reception data.

* * * * *